United States Patent [19]

Taylor

[11] Patent Number: 5,962,556
[45] Date of Patent: Oct. 5, 1999

[54] FUNCTIONAL LATEXES RESISTANT TO HYDROLYSIS

[75] Inventor: James Wayne Taylor, Kingsport, Tenn.

[73] Assignee: Eastman Chemical Company, Kingsport, Tenn.

[21] Appl. No.: 08/861,437

[22] Filed: May 21, 1997

Related U.S. Application Data

[60] Provisional application No. 60/029,756, Oct. 22, 1996, and provisional application No. 60/036,116, Jan. 17, 1997.

[51] Int. Cl.$^6$ .............................. C08K 3/20; C08L 63/02
[52] U.S. Cl. ........................ 523/412; 523/410; 524/811; 524/813; 524/832
[58] Field of Search ................................ 524/811, 813, 524/832; 523/410, 412

[56] References Cited

U.S. PATENT DOCUMENTS

| | | | |
|---|---|---|---|
| 3,113,038 | 12/1963 | Lattarulo et al. | 117/140 |
| 3,261,797 | 7/1966 | McDowell et al. | 260/29.6 |
| 3,290,417 | 12/1966 | Christenson et al. | 260/901 |
| 3,325,443 | 6/1967 | Christenson et al. | 260/41 |
| 3,356,627 | 12/1967 | Scott | 260/29.6 |
| 3,386,939 | 6/1968 | Mesee et al. | 260/29.3 |
| 3,483,149 | 12/1969 | Gresenz et al. | 260/18 |
| 3,553,116 | 1/1971 | Kaplan et al. | 260/17 |
| 3,607,834 | 9/1971 | Marx et al. | 260/63 R |
| 3,639,327 | 2/1972 | Drelich | 260/29.6 NR |
| 3,678,013 | 7/1972 | Sherwood et al. | 260/77.5 R |
| 3,679,564 | 7/1972 | Dowbenko et al. | 204/181 |
| 3,725,124 | 4/1973 | Gorton et al. | 117/138.8 UA |
| 3,927,206 | 12/1975 | Blank et al. | 424/81 |
| 4,136,067 | 1/1979 | Reed et al. | 521/32 |
| 4,158,725 | 6/1979 | Nishimura et al. | 526/52.1 |
| 4,210,565 | 7/1980 | Emmons et al. | 260/29.6 TA |
| 4,239,893 | 12/1980 | Pigerol et al. | 546/321 |
| 4,241,682 | 12/1980 | Kondstandt | 114/67 R |
| 4,244,850 | 1/1981 | Mylonakis | 260/29.6 M |
| 4,535,128 | 8/1985 | Umemoto et al. | 525/162 |
| 4,812,541 | 3/1989 | Mallya et al. | 526/264 |
| 4,820,863 | 4/1989 | Taylor | 560/115 |
| 4,855,349 | 8/1989 | Ingle | 524/432 |
| 4,906,684 | 3/1990 | Say | 524/548 |
| 4,908,229 | 3/1990 | Kissel | 427/54.1 |
| 4,908,403 | 3/1990 | Spada et al. | 524/818 |
| 4,987,186 | 1/1991 | Akiyama et al. | 525/107 |
| 5,002,998 | 3/1991 | Carey et al. | 524/555 |
| 5,021,469 | 6/1991 | Langerbeins et al. | 523/201 |
| 5,053,441 | 10/1991 | Biale | 523/201 |
| 5,055,506 | 10/1991 | Knutson | 524/100 |
| 5,073,445 | 12/1991 | Ingle | 428/314.4 |
| 5,100,969 | 3/1992 | Yamamoto et al. | 525/327.3 |
| 5,108,575 | 4/1992 | Chung et al. | 204/181.7 |
| 5,185,397 | 2/1993 | Biale | 524/820 |
| 5,202,375 | 4/1993 | Biale | 524/562 |
| 5,227,413 | 7/1993 | Mitra | 523/116 |
| 5,242,978 | 9/1993 | Muller et al. | 525/102 |
| 5,244,963 | 9/1993 | Biale | 524/555 |
| 5,246,984 | 9/1993 | Darwen et al.l | 523/404 |
| 5,247,040 | 9/1993 | Amick et al. | 526/286 |
| 5,270,380 | 12/1993 | Adamson et al. | 524/556 |
| 5,277,978 | 1/1994 | Feustel et al. | 428/402 |
| 5,296,530 | 3/1994 | Bors et al. | 524/558 |
| 5,308,890 | 5/1994 | Snyder | 523/201 |
| 5,344,675 | 9/1994 | Snyder | 427/388.4 |
| 5,349,026 | 9/1994 | Emmons et al. | 525/328.6 |
| 5,362,816 | 11/1994 | Snyder et al. | 525/329.9 |
| 5,364,891 | 11/1994 | Pears et al. | 522/149 |
| 5,371,148 | 12/1994 | Taylor et al. | 525/293 |
| 5,391,624 | 2/1995 | Rasoul et al. | 525/216 |
| 5,414,041 | 5/1995 | Larson et al. | 524/589 |
| 5,426,129 | 6/1995 | Emmons et al. | 522/6 |
| 5,484,849 | 1/1996 | Bors et al. | 525/167.5 |
| 5,494,961 | 2/1996 | Lavoie et al. | 525/102 |
| 5,494,975 | 2/1996 | Lavoie et al. | 525/928.6 |
| 5,498,659 | 3/1996 | Esser | 524/549 |
| 5,525,662 | 6/1996 | Lavoie et al. | 524/558 |

(List continued on next page.)

FOREIGN PATENT DOCUMENTS

| | | |
|---|---|---|
| 341886 | 11/1989 | European Pat. Off. . |
| 358358 | 3/1990 | European Pat. Off. . |
| 390370 | 10/1990 | European Pat. Off. . |
| 483915 | 5/1992 | European Pat. Off. . |
| 0 552 469 A2 | 7/1993 | European Pat. Off. . |
| 555774 | 8/1993 | European Pat. Off. . |
| WO95/09209 | 4/1995 | European Pat. Off. . |
| 705855 | 4/1996 | European Pat. Off. . |
| 2535372 | 2/1977 | Germany . |
| 3713511 | 12/1987 | Germany . |
| 61-21171 | 1/1986 | Japan . |
| 1-229242 | 9/1989 | Japan . |
| 3-6236 | 1/1991 | Japan . |
| 4-189874 | 7/1992 | Japan . |
| 1151479 | 5/1969 | United Kingdom . |
| WO 91-14715 | 10/1991 | WIPO . |
| WO 95/00573 | 1/1995 | WIPO . |
| WO 96/16998 | 6/1996 | WIPO . |
| WO 96/32424 A2 | 10/1996 | WIPO . |

OTHER PUBLICATIONS

D. Horn, "Polyethylenimine–Physicochemical Properties and Applications" 1980.

Nishihata et al., "Formation and Hydrolysis of Enamine in Aqueous Solution" Chem. Pharm. Bull., Jan. 26, 1984.

Rector et al., "Applications for the Acetoacetyl Functionally in Thermoset Coatings" Feb. 3, 1988.

(List continued on next page.)

*Primary Examiner*—Robert Dawson
*Assistant Examiner*—D. Aylward
*Attorney, Agent, or Firm*—Rose M. Allen; Harry J. Gwinnell

[57] ABSTRACT

The present invention is directed to a functional latex polymer composition resistant to hydrolysis which contains a vinyl polymer of copolymerizable monoethylenically unsaturated monomers where at least one monomer contains at least one hydrolyzable functional group. The combined oxygen and nitrogen content of the vinyl polymer is up to about 27 wt %, based on the monomers in the vinyl polymer.

20 Claims, 11 Drawing Sheets

U.S. PATENT DOCUMENTS

| | | | |
|---|---|---|---|
| 5,534,310 | 7/1996 | Rokowski et al. | 427/494 |
| 5,541,251 | 7/1996 | Bontinck et al. | 524/507 |
| 5,548,024 | 8/1996 | Lavoie et al. | 525/102 |
| 5,559,092 | 9/1996 | Bors et al. | 525/300 |
| 5,562,953 | 10/1996 | Bors et al. | 427/558 |
| 5,605,722 | 2/1997 | Esser | 427/388.4 |
| 5,605,952 | 2/1997 | Esser | 524/522 |
| 5,605,953 | 2/1997 | Esser | 524/522 |
| 5,609,965 | 3/1997 | Esser | 428/522 |
| 5,616,764 | 4/1997 | Lavoie et al. | 556/482 |
| 5,672,379 | 9/1997 | Schall et al. | 427/137 |
| 5,763,546 | 6/1998 | Jung et al. | 525/313 |
| 5,767,199 | 6/1998 | Bors et al. | 525/153 |

OTHER PUBLICATIONS

Lee et al., "Effects of Surfactants and Polymerization Methods On The Morphology of Particles Formed in 'Core–Shell' Emulsion Polymerization of Methyl Methacrylate and Styrene" Makromol. Chem., Sep. 8, 1989.

"For Your Unlimited Imagination: Polymin (Polyethylenimine)" 1992 BASF Corporation.

Moszner et al. "Reaction behaviour of monomeric β–ketoesters" Polymer Bulletin, 1994.

Keith M. Moody, "Waterborne Acrylic Emulsion Using AAEM" Technical Tips, Eastman Kodak Company Sep. 1, 1995.

Derwent Abstract of JP03020302, Jan. 29, 1991.

Derwent Abstract of JP60127376, Jul. 08, 1995.

Geurink et al. Prog. in Org. Coatings 27(1–4) pp. 73–78, 1996.

FUNCTIONAL LATEXES RESISTANT TO HYDROLYSIS

This application claims the benefit of U.S. Provisional applications No. 60/029756 filed Oct. 22, 1996 and No. 60/036116 filed Jan. 17, 1997.

FIELD OF THE INVENTION

The present invention is directed to a polymer latex composition containing at least one hydrolyzable functional group and which is resistant to hydrolysis.

DESCRIPTION OF THE RELATED ART

Latex polymers containing a hydrolyzable functional moiety, such as a pendent acetoacetoxy group or an enamine formed by reaction of the acetoacetoxy functionality with an ammonia or a volatile amine, find utility in coatings, adhesives, sealants, etc. The properties of such latex polymers improve when the pendant functionality remains unhydrolyzed until a film is formed from such latexes and crosslinking occurs. Thus, it is important that the functionality is retained during storage and transportation and is available for crosslinking upon film formation at the time of use. However, pendant functionalities, such as acetoacetoxy or enamine, can hydrolyze, particularly at elevated temperatures, during storage or transportation in which case the functionality is not available for crosslinking upon film formation.

U.S. Pat. No. 5,484,849 refers to a method of curing vinyl polymers containing acetoacetoxy functionalities where the polymers are dispersed or dissolved in aqueous solvents. To resist hydrolysis, the acetoacetoxy functionality is transformed into an enamine group by treating the polymer containing the acetoacetoxy group, after preparation and neutralization, with an additional molar equivalent of ammonia or a primary amine such as ethanolamine, methylamine, or isopropylamine. However, the compositions of U.S. Pat. No. 5,484,849 still lack the stability, required in most coating applications, for prolonged storage and during transportation, particularly, at elevated temperatures.

Thus, there remains a need for a latex composition containing hydrolyzable pendant functionalities, such as acetoacetoxy or enamine functionality, which can be retained substantially unhydrolyzed, during prolonged storage and transportation, particularly, at elevated temperatures.

SUMMARY OF THE INVENTION

It is an object of the present invention to provide a functional latex polymer composition, resistant to hydrolysis, containing at least one pendant hydrolyzable functional moiety. It is a further object of the present invention to provide a method to synthesize a functional latex polymer composition resistant to hydrolysis, containing at least one hydrolyzable functionality, such as an acetoacetoxy pendant group, an enamine formed by reaction of the acetoacetoxy group with ammonia or a volatile amine, a carbonate group, an epoxide group or an isocyanate group.

A novel functional latex polymer composition resistant to hydrolysis has been synthesized in accordance with the invention by adjusting the combined oxygen and nitrogen content of the comonomers used to synthesize the functional latex polymer composition containing the hydrolyzable functional group. The polymer contains at least one hydrolyzable functional group, such as acetoacetoxy pendant group, an enamine, a carbonate group, an epoxide group or an isocyanate group. A range of a combined oxygen and nitrogen content has been discovered at which the hydrolyzable functionality is resistant to hydrolysis.

DESCRIPTION OF THE PREFERRED EMBODIMENTS

Figure 1:
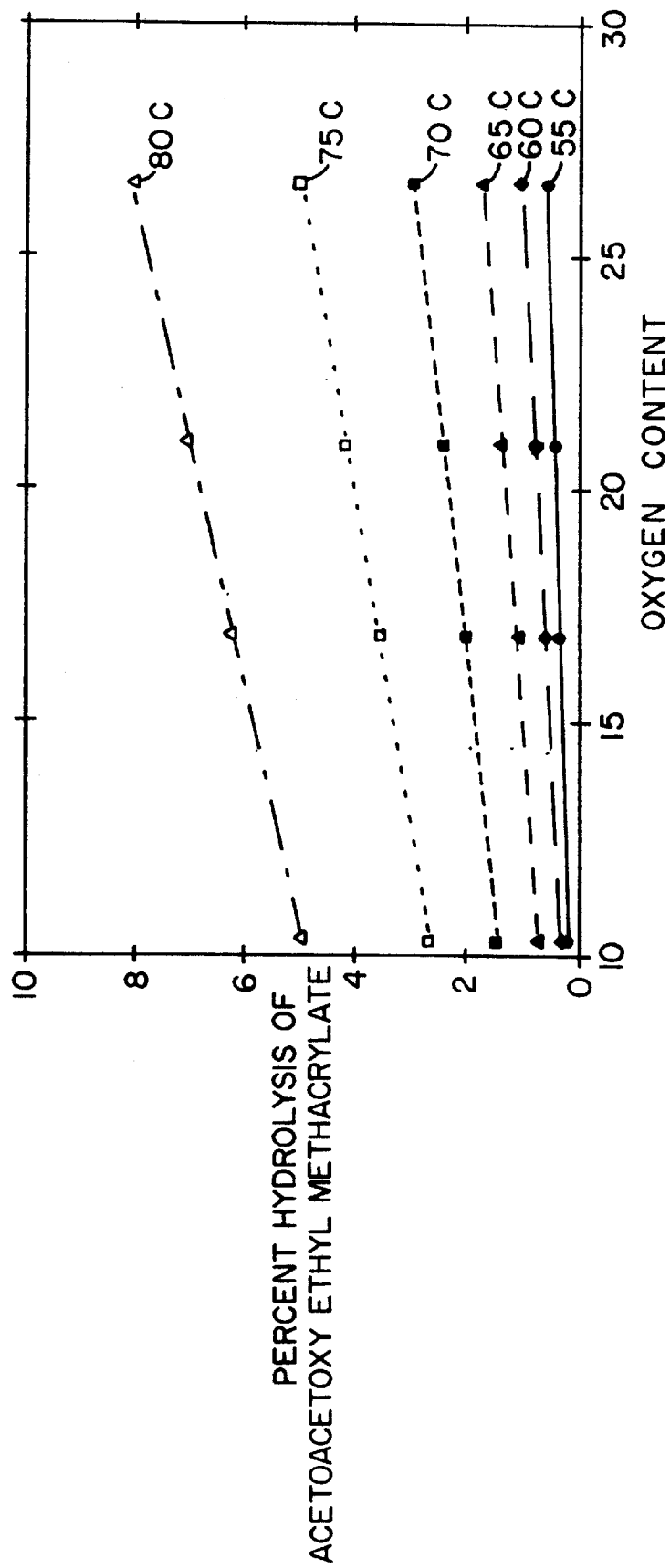
FIG. 1 depicts the percent hydrolysis of acetoacetoxy ethyl methylacrylate as a function of oxygen content at different temperatures.

Accordingly, the present invention provides a novel composition with unexpected hydrolytic stability during extended storage time and/or at elevated temperatures.

A more complete appreciation of the invention and many of the attendant advantages thereof will be readily obtained as the same becomes better understood by reference to the figures and to the following detailed description.

Accordingly, there is provided a functional polymer latex composition resistant to hydrolysis containing a vinyl polymer which is synthesized from copolymerizable monoethylenically unsaturated monomers, one of which contains at least one pendant hydrolyzable functionality. The combined oxygen and nitrogen content of the copolymerizable monomers is up to 27 wt %, based on the total weight of the monomers. Preferably, the combined oxygen and nitrogen content is up to 20% and more preferably up to 10%. In a particularly preferred embodiment, the combined oxygen and nitrogen content ranges from about 5 to 22%.

The oxygen and nitrogen content of a polymer is determined by the following equations:

% Oxygen=(Total weight of oxygen in monomers/Total weight of monomers)*100.

% Nitrogen=(Total weight of nitrogen in monomers/Total weight of monomers)*100.

Thus, by way of example, the oxygen content of Example 3 (below) of the present application is calculated as follows:

| Monomer | Percent Monomer | Total Mono-mer[5] (g) | Mole of Monomer | No. of Nitrogen and Oxygen Atoms | Oxygen (g) |
|---|---|---|---|---|---|
| MMA[1] | 19 | 68.02 | 0.6794 | 2 | 21.74 |
| STY[2] | 30 | 107.4 | 1.033 | 0 | 0 |
| BA[3] | 39 | 139.6 | 1.090 | 2 | 34.87 |
| AAEM[4] | 12 | 42.96 | 0.201 | 5 | 16.06 |
| Total | | 358 | | | 72.7 |

[1]MMA: methyl methacrylate
[2]STY: styrene
[3]BA: butyl acrylate
[4]AAEM: acetoacetoxyethyl methacrylate Calculation of percent oxygen:

Percent Oxygen=(Wt. Oxygen/Total Monomer)*100
Percent Oxygen=(72.7/358)*100
Percent Oxygen=20.3

The functional latex polymer composition in accordance with the present invention maybe prepared by an emulsion or suspension free radical polymerization of monoethylenically unsaturated monomers. The polymer may be a homopolymer or a copolymer of monomers having hydrolyzable functional moieties and other monoethylenically unsaturated monomers.

A preferred pendant functional moiety in accordance with the present invention is an acetoacetoxy group. An acetoacetoxy group is incorporated into the polymer as a pendant functionality by polymerization of a monomer containing at least one acetoacetoxy functional moiety. The term "polymer" is used throughout this description to denote a homopolymer or copolymer.

A preferred acetoacetoxy functional monomer is represented by formula (I):

$$R^1—CH=C(R^2)C(=O)—X^1—X^2—X^3—C(=O)—CH_2—C(=O)—R^3 \quad (I)$$

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S or a group of the formula: —N($R^1$)—, where $R^1$ is a $C_1$–$C_6$ alkyl group; $X^2$ is a $C_2$–$C_{12}$ alkylene group or $C_3$–$C_{12}$ cycloalkylene group. The alkyl and alkylene group described here and through the specification maybe straight or branched.

Preferred monomers of formula (I) are acetoacetoxyethyl (meth)acrylate, acetoacetoxy (methyl)ethyl (meth)acrylate, acetoacetoxypropyl (meth)acrylate and acetoacetoxybutyl (meth)acrylate. The term "(meth)acrylate" is used to denote methacrylate or acrylate. Acetoacetoxyethyl (meth)acrylate (AAEM) is a particularly preferred monomer of formula (I). A pendant acetoacetoxy group, or other pendant hydrolyzable functional moiety on a polymer of the invention, is not strictly limited to terminal groups of the polymer. Pendant groups include those groups attached to the polymer backbone and available for further reaction. The amount of the acetoacetoxy containing monomer may range from 3 to 30 wt %, based on the total amount of the monomers; the preferred amount is 5 to 20 wt %; while the most preferred amount is 12 to 15 wt % based on the total amount of monomers.

An additional, preferred pendant hydrolyzable functional moiety in accordance with the present invention is a carbonate group. Suitable copolymerizable monoethylenically unsaturated monomers containing a carbonate hydrolyzable monomer in accordance with the present invention are, for example, those of the general formula (II):

$$R^4CH=CH—O—C(O)—C(R^4)_3 \quad (II)$$

wherein $R^4$ is independently hydrogen or $C_1$–$C_{12}$ alkyl group. Particular monomers of formula (II) include: $CH_2=CH—O—C(O)—C(CH_3)_3$, $CH_2=CH—O—C(O)—CH(C_2H_5)(C_4H_9)$, $CH_2=CH—O(=O)—CH_3$ and $CH_2=CH—O—C(O)—CH_2CH_3$.

The amount of a carbonate containing monomer may range from 2 to 24 wt % based on the total amount of monomers; the preferred amount is 6 to 12 wt %, based on the total amount of monomers.

Another preferred pendant hydrolyzable functional moiety in accordance with the present invention is an epoxide moiety. Suitable copolymerizable monoethylenically unsaturated monomers containing an epoxide hydrolyzable moiety in accordance with the present invention include those of general formula (III):

$$R^5—R^6—R^7—R^8 \quad (III)$$

where $R^5$ is selected from

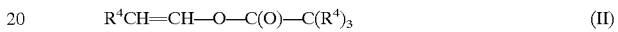

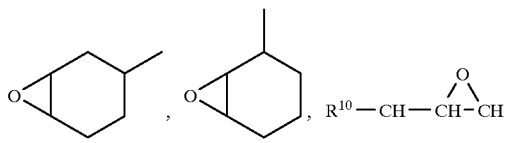

where $R^{10}$ is hydrogen or a $C_1$–$C_3$ alkyl group; $R^6$ is selected from —C(=O)—O— or —O—C(=O)— group; $R^7$ is selected from —(—CH$_2$CH$_2$—O)n—CH$_2$CH$_2$—O—C(=O)— or a $C_1$–$C_6$ alkyl group, where n is an integer of 0 to 100; $R^8$ is —CHR$^9$=CHR$^9$, where $R^9$ are the same or different and are selected from hydrogen or methyl group. Further, $R^8$ may be directly connected to $R^5$, or $R^8$—$R^7$— may be directly connected to $R^5$, or $R^8$ may be connected to $R^5$—$R^6$— group. By way of example, monomers of formula (III) include glycidyl (meth)acrylate, allyl glycidyl ether,

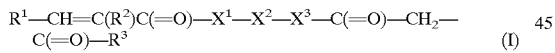

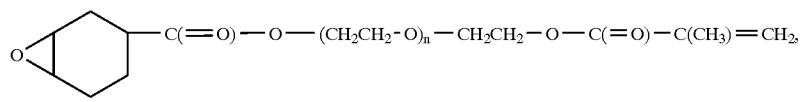

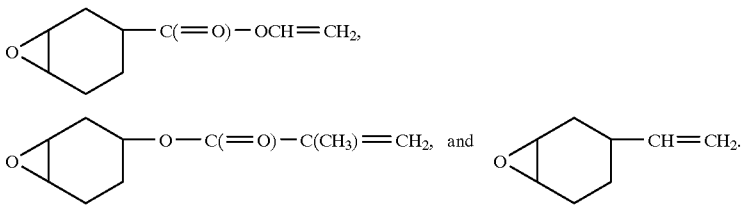

Further, a macromonomer containing at least one epoxide group is suitable monomer in accordance with the present invention. The term "macromonomer" is used to denote oligomeric or polymeric materials that contain a monoethylenically unsaturated functionality. The percent amount of an epoxide containing monomer may range from 2 to 24 wt % based on the total amount of monomers; the preferred amount is 6 to 12 wt %, based on the total amount of monomers.

Another preferred pendant hydrolyzable functional moiety in accordance with the present invention is an isocyanate group. Suitable copolymerizable monoethylenically unsaturated monomers containing an isocyanate hydrolyzable moiety in accordance with the present invention include those of general formula (IV)

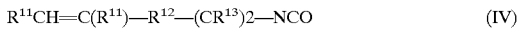
$$R^{11}CH=C(R^{11})-R^{12}-(CR^{13})2-NCO \qquad (IV)$$

where $R^{11}$ is a hydrogen or a methyl group; $R^{12}$ is a $C_1$–$C_{20}$ alkyl group, a $C_3$–$C_8$ cycloalkyl group, an aryl group, a —C(=O)—O— group, or a —C(=O)—O—$R^{14}$— group, where $R^{14}$ is a $C_1$–$C_{20}$ alkyl group. Further, in the present application, "aryl" refers to phenyl, naphthyl, or anthracenyl, in which each hydrogen atom may be replaced with a $C_1$–$C_{10}$ alkyl group (preferably with $C_1$–$C_6$ alkyl group and more preferably with methyl). Thus, phenyl may be substituted from 1 to 4 times and naphthyl may be substituted from 1 to 6 times. When $R^{12}$ is phenyl, attachment of the additional groups, namely: $R^{11}CH=C(R^{11})$— and —$(CR^{13})_2$—NCO may be in the ortho, meta or para positions. Further, "alkyl" in this context refers to a straight chain or branched alkyl group. In addition, a "cycloalkyl" group may have additional $C_1$–$C_{10}$ alkyl substitutents. Further, $R^{13}$ are independently a hydrogen or a $C_1$–$C_3$ alkyl group. A preferred copolymerizable monoethylenically unsaturated monomer containing an isocyanate moiety is m-isopropenyl-α,α-dimethylbenzyl isocyanate.

Suitable copolymerizable monoethylenically unsaturated monomers for the preparation of the functional latex polymer composition in accordance with the present invention include, but are not limited to, a monoethylenically unsaturated monomer which may be represented by the general formula (V):

$$CH_2=C(R^{15})\ COOR^{16} \qquad (V)$$

where $R^{15}$ is hydrogen or a $C_1$–$C_3$ alkyl group, and $R^{16}$ is a $C_1$–$C_{20}$ alkyl group, phenyl, benzyl, hydroxy—$(C_1$–$C_4)$—alkyl, alkoxy—$(C_1$–$C_4)$ alkyl, cyclopentyl, cyclohexyl, furyl, $C_1$–$C_4$ alkyl furyl, tetrahydrofuryl, $C_1$–$C_4$ alkyl tetrahydrofuryl and combinations of these monomers thereof. Combinations of monomers where $R^{15}$ is hydrogen and monomers wherein $R^{15}$ is an alkyl group are used to modify the glass transition temperature of the functional latex polymer. Preferred examples of comonomers are, but not limited to, methyl (meth)acrylate, ethyl (meth)acrylate, propyl (meth)acrylate, isopropyl (meth)acrylate, butyl (meth) acrylate, isobutyl (meth)acrylate, hexyl (meth)acrylate, isooctyl (meth)acrylate, isodecyl (meth)acrylate, lauryl (meth)acrylate, stearyl (meth)acrylate, phenoxyethyl (meth) acrylate, methoxyethyl (meth)acrylate, benzyl (meth) acrylate, ethoxyethyl (meth)acrylate, 2-ethylhexyl (meth) acrylate, cyclopentyl (meth)acrylate and isobutyl (meth) acrylate, as well as combinations of those monomers thereof. A combination of these monomers may be used in order to achieve an appropriate Tg or other properties for the functional latex polymer.

Acrylic and methacrylic acid esters having a $C_1$–$C_{20}$ alcohol moiety are commercially available or can be prepared by known esterification processes. The acrylic and methacrylic acid ester may contain additional functional groups, such as, hydroxyl, amine, halogen, ether, carboxylic acid, amide, nitrile, and alkyl group. Preferred esters are: carbodiimide (meth)acrylate, methyl (meth)acrylate, ethyl (meth)acrylate, butyl (meth)acrylate, isobutyl (meth) acrylate, ethylhexyl (meth)acrylate, octyl (meth)acrylate, isobutyl (meth)acrylate, allyl (meth)acrylate, and glycidyl (meth)acrylate.

Additional suitable copolymerizable monoethylenically unsaturated monomers include styrenic monomer. Styrenic monomer denotes styrene, or a substituted styrene such as $C_1$–$C_6$ alkyl ring-substituted styrene, $C_1$–$C_3$ alkyl a-substituted styrene or a combination of ring and a-alkyl substituted styrene. Preferred styrenic copolymerizable monomers include styrene, p-methyl styrene, o-methyl styrene, p-butyl styrene, a-methyl styrene and combinations thereof.

In addition, vinyl esters of the general Formula (VI) may be used as copolymerizable monoethylenically unsaturated monomers:

$$RCH=CH-O-C(O)-C(R)_3 \qquad (VI)$$

In Formula (2), R is independently hydrogen or an alkyl group of up to 12 carbon atoms. Particular monomers of Formula (VI) include $CH_2=CH-O-C(O)-CH_3$, $CH_2=CH-O-C(O)-C(CH_3)_3$, $CH_2=CH-O-C(O)-CH(C_2H_5)(C_4H_9)$, and $CH_2=CH-O-C(O)-CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

It should be emphasized that, not only is the hydrolytic stability of a functional latex polymer enhance, but also the hydrolytic stability of a functional monomer containing a hydrolyzable functionality is enhanced as the oxygen content of the monomer mixture used to form the functional latex polymer composition is decreased. This is depicted in FIG. 1, where the percent hydrolysis of the acetoacetoxy ethyl methacrylate is plotted against oxygen content at various temperatures.

In general, the vinyl monomers are polymerized by a conventional suspension or emulsion free-radical initiated polymerization technique. The polymerization can be initiated by a water-soluble or water-dispersible free-radical initiator, optionally in combination with a reducing agent, at an appropriate temperature, usually between 55 and 90° C. The polymerization of the monomers may be conducted batch wise, semi-batch or in a continuous mode.

A conventional surfactant or a combination of surfactants can be used such as anionic or non-ionic emulsifier in the suspension or emulsion polymerization to prepare a polymer of the invention. Examples of preferred surfactants include, but are not limited to, alkali or ammonium alkylsulfate, alkylsulfonic acid, or fatty acid, oxyethylated alkylphenol, or any combination of anionic or non-ionic surfactant. A more preferred surfactant monomer is HITENOL HS-20 (which is a polyoxyethylene alkylphenyl ether ammonium sulfate available from DKS International, Inc., Japan). A list of surfactants is available in the treatise: McCutcheon's Emulsifiers & Detergents, North American Edition and International Edition, MC Publishing Co., Glen Rock, N.J. 1993. The amount of the surfactant used is usually between 0.1 to 6 wt %, based on the total weight of the monomers.

As polymerization initiators, any conventional free-radical initiator may be used such as hydrogen peroxide, t-butylhydroperoxide, ammonium or alkali sulfate, di-benzoyl peroxide, lauryl peroxide, di-tertiarybutylperoxide, 2, 2'-azobisisobuteronitrile, benzoyl peroxide, and the like. The amount of the initiator is typically between 0.05 to 6.0 wt %, based on the total weight of the total monomers.

A free-radical initiator may be combined with a reducing agent to form a redox initiating system. Suitable reducing agents are those which increase the rate of polymerization and include, for example, sodium bisulfide, sodium hydrosulfide, sodium,ascorbic acid, isoascorbic acid and mixtures thereof. The redox initiating system can be used at similar levels as the free-radical initiators.

In addition, in combination with the initiators and reducing agents, polymerization catalysts may be used. Polymerization catalysts are those compounds which increase the rate of polymerization by promoting decomposition of the free radical initiator in combination with the reducing agent at the reaction conditions. Suitable catalysts include transition metal compounds such as, for example, ferrous sulfate heptahydrate ($FeSO_4 \cdot 7H_2O$), ferrous chloride, cupric sulfate, cupric chloride, cobalt acetate, cobaltous sulfate, and mixtures thereof.

In addition, a low level of a chain transfer agent may also be used to prepare a polymer in accordance with the invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl-3-mercaptopropionate, n-butyl-3-mercaptopropionate, isodecylmercaptan, octadecylmercaptan, mercaptoacetic acid, haloalkyl compounds, (such as carbon tetrabromide and bromodichloromethane), and the reactive chain transfer agents described in U.S. Pat. No. 5,247,040, incorporated herein by reference. In particular, mercaptopropionate, allyl mercaptopropionate, allyl mercaptoacetate, crotyl mercaptopropionate and crotyl mercaptoacetate, and mixtures thereof, represent preferred chain transfer agents.

In a preferred embodiment of the present invention, a copolymerizable monomer known to promote wet adhesion may be incorporated into the polymer. Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate and N-(2-methacryloyloxy-ethyl) ethylene urea.

Water-dispersible and water-soluble polymers may also be employed as surfactants or stabilizers in accordance with the present invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413, all of which are incorporated herein by reference. Cellulosics and polyvinyl alcohols may also be used. Surfactants and stabilizers may be used during the polymerization to control, for example, particle nucleation and growth, particle size and stability or they may be post added to enhance stability of the latex or modify other properties of the latex such as surface tension, wet ability and the like.

In a preferred embodiment at least one ethylenically unsaturated copolymerizable surfactant may be employed. Copolymerizable surfactants possessing isopropenyl phenyl or allyl groups are preferred. Copolymerizable surfactants may be anionic, such as containing a sulfate or sulfonate group, or nonionic surfactants. Other copolymerizable surfactants include those containing polyoxyethylene alkyl phenyl ether moieties. Additional copolymerizable surfactants include sodium alkyl allyl sulfosuccinate.

A preferred molecular weight of the polymer in accordance with the invention, is a weight average molecular weight (Mw) of from 1,000 to 1,000,000, as determined by gel permeation chromatography (GPC). A more preferred range for the weight average molecular weight is from 5,000 to 250,000.

A preferred particle size for the aqueous dispersion in accordance with the invention is from 0.01 to 25 μm. Thus, in an emulsion polymerization, in accordance with the invention, the particle size of the latex may range from 0.01 to about 3 μm. On the other hand, in a suspension polymerization in accordance with the invention, the latex particle size may range from 2 to 25 μm. In a preferred embodiment, the particle size of a dispersion formed by emulsion polymerization may range from about 0.05 to about 1.5 μm. A more preferred range is 0.1 to 1.0 μm.

The polymer particles generally have a spherical shape. In a preferred embodiment, the spherical polymeric particle has a core portion and a shell portion or a gradient structure. The core/shell polymer particles may also be prepared in a multi-lobe form, a peanut shell, an acorn form, a raspberry form or any other form. It is further preferred, wherein particles have a core/shell structure that the core portion comprises about 20 to about 80 wt % of the total weight of the particle, and the shell portion comprises about 80 to about 20 wt % of the total weight of the particle.

The glass transition temperature (Tg) of the polymer in accordance with the present invention, may be up to about 100° C. In a preferred embodiment of the present invention, where a film forming at ambient temperatures of the particles is desirable, the glass transition temperature may preferably be under 60° C.

Figure 2:
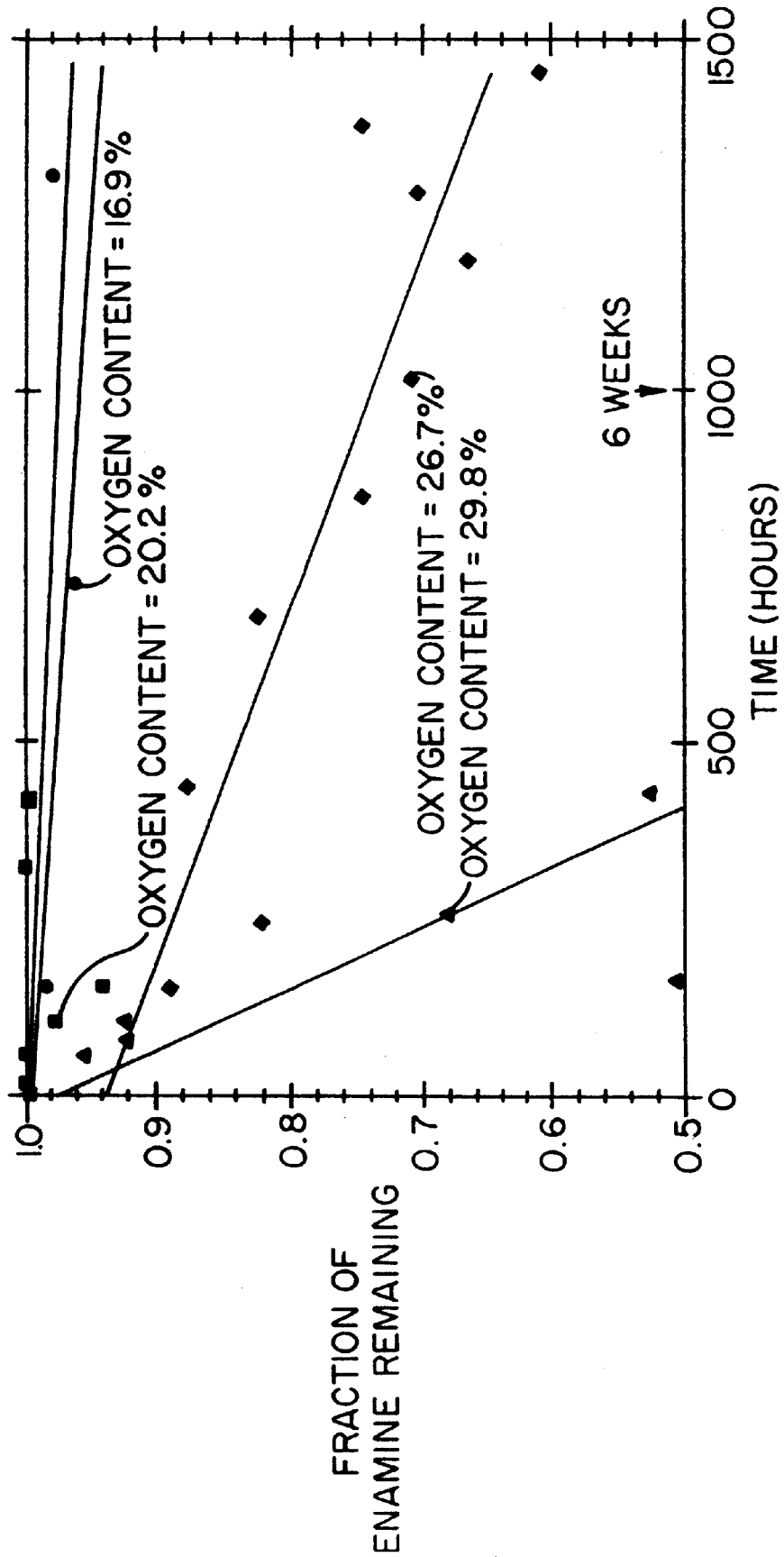
FIG. 2 depicts the fraction of acetoacetoxy enamine functionality remaining as a function of time and oxygen content at 50° C.
Figure 3:
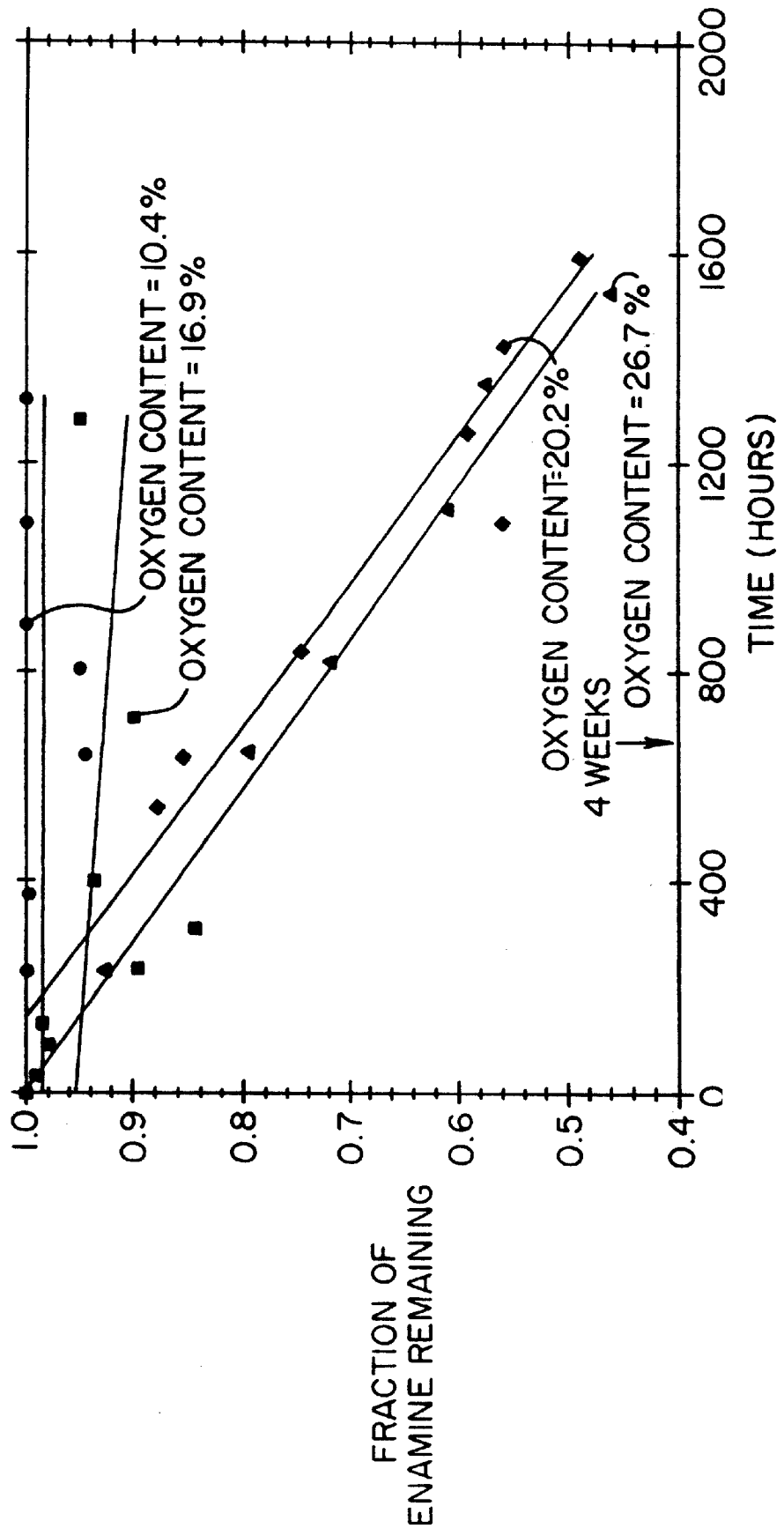
FIG. 3 depicts the fraction of acetoacetoxy enamine functionality remaining as a function of time and oxygen content at 60° C.

Enamine functional polymers represent a preferred derivative of polymers according to the invention having pendant acetoacetoxy groups. In aqueous dispersions the enamine functionality serves to improve the hydrolytic stability of the acetoacetoxy group. Enamine functional polymers have been described in Polymer Bulletin 32,419–426 (1994). Additionally, enamine functional polymers are described in European Patent Application No. 0492847 A2; U.S. Pat. No. 5,296,530; and U.S. Pat. No. 5,484,849, all of which are incorporated herein by reference. By way of an example, FIG. 2 shows a preferred embodiment where the hydrolyzable functionality is an enamine. The amount of unhydrolyzed functionality (enamine) remains substantially unchanged at oxygen content of up to 21 wt % after 1500 hours at 50° C.; slightly at 26 wt % oxygen content after 1500 hours at 50° C.; while substantially hydrolyzed at 29 wt % oxygen content after less than 500 hours at 50° C.

Figure 6:
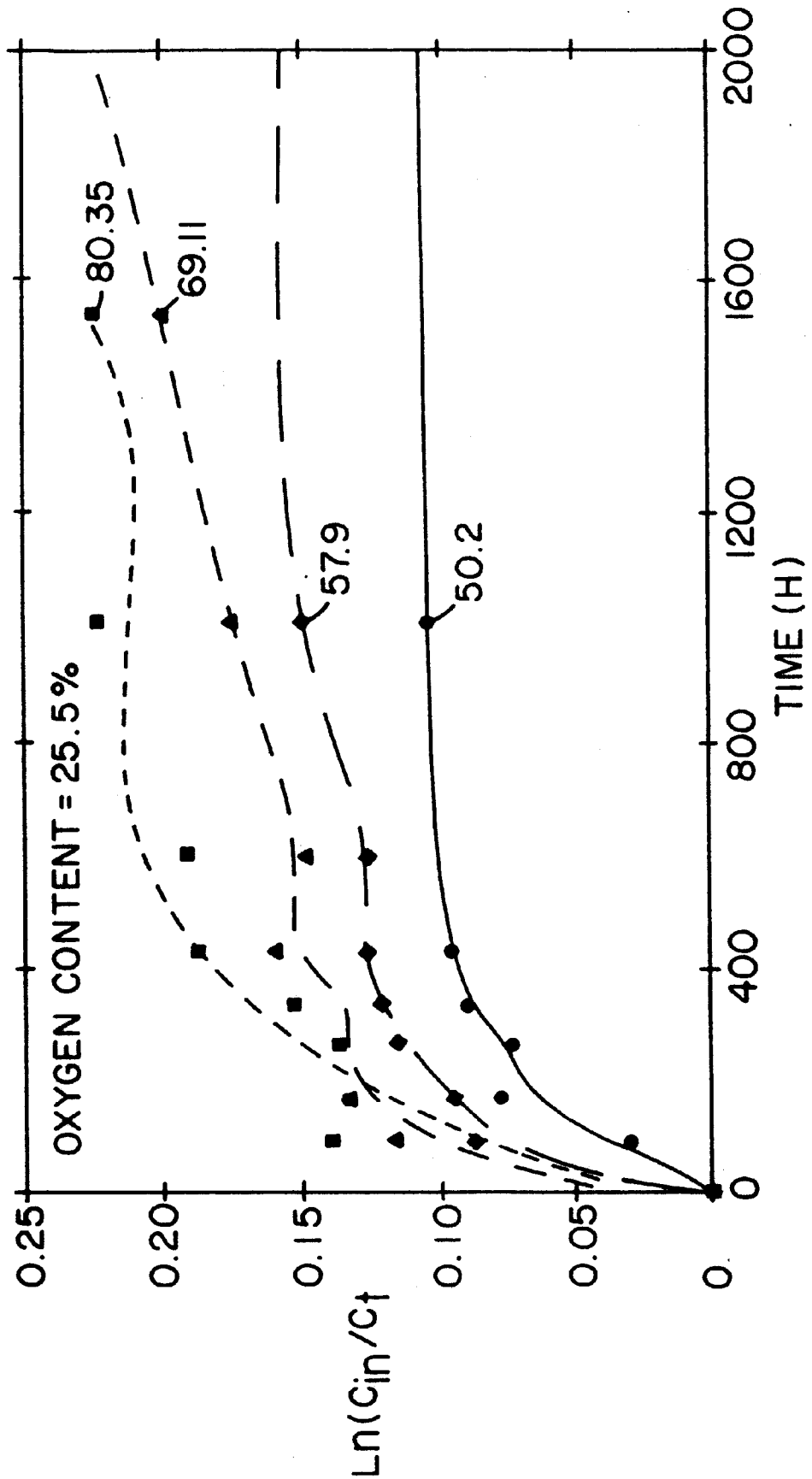
FIG. 6 depicts hydrolysis data in an all vinyl ester-based latex containing a carbonate functional group.
Figure 7:
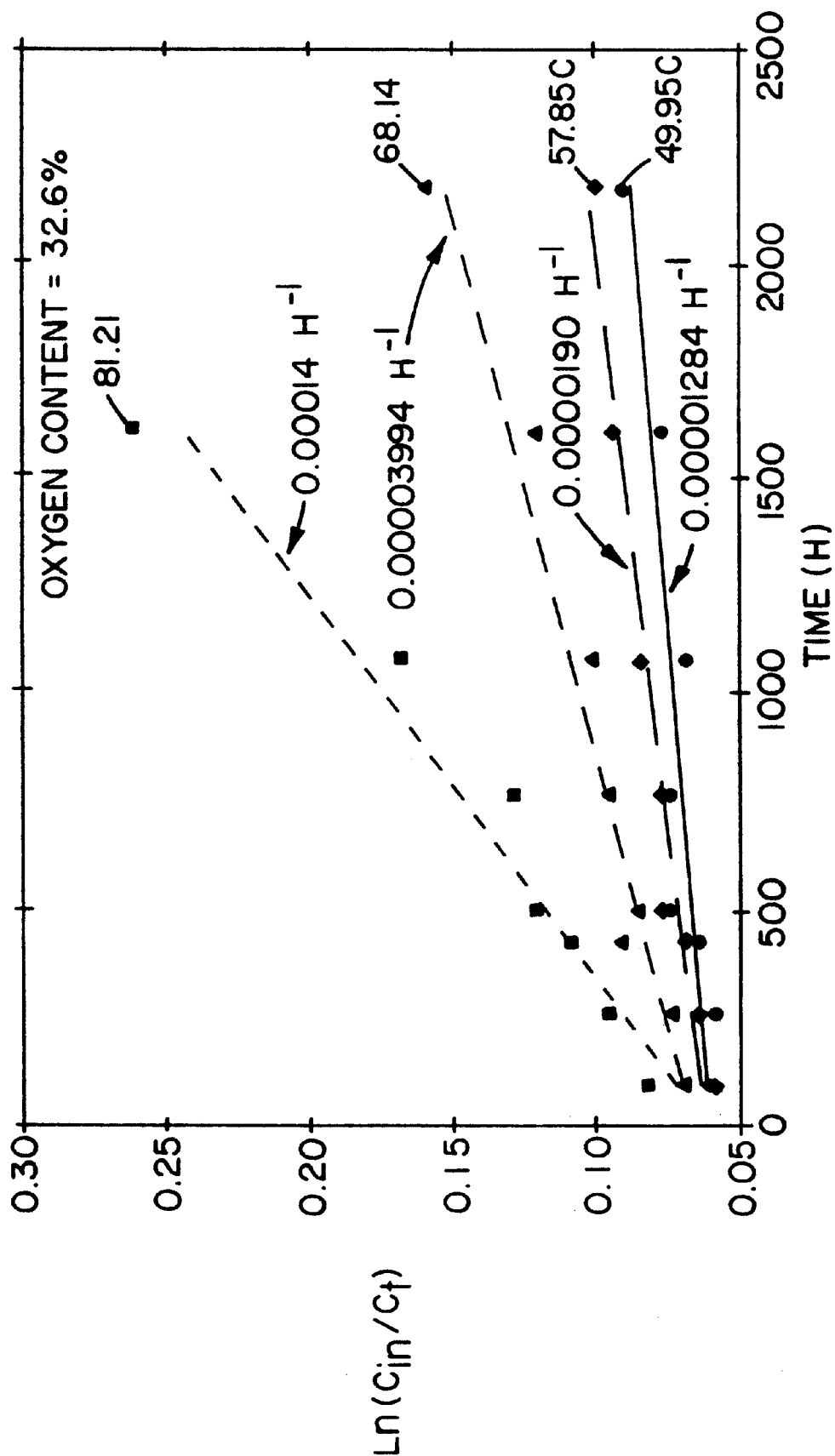
FIG. 7 depicts hydrolysis data in a vinyl ester-acrylic-based latex containing a carbonate functional group.

It was unexpectedly found that an all-vinyl ester-based latex containing a carbonate hydrolyzable group gives a nonlinear response to hydrolysis as a function of time whereas a vinyl ester-acrylic-based latex containing a carbonate hydrolyzable group gives a linear response. The hydrolysis results for the above two types of latexes containing a carbonate group are shown in FIGS. 6 and 7, respectively.

Having generally described this invention a further understanding can be obtained by reference to certain specific examples which are provided herein for purpose of illustration only and are not intended to be limiting unless otherwise specified.

EXAMPLE 1

Preparation of Small Unstructured Acetoacetoxy-Containing Waterborne Particles (Latex particles contain 10.9% acetoacetoxyethyl methacrylate (AAEM); Oxygen Content: 10.4)

To a 1,000 mL resin kettle equipped with a condenser, nitrogen purge, and subsurface feed tube were added 340 g of water, 15.52 g of HITENOL HS-20 (which is a polyoxyethylene alkylphenyl ether ammonium sulfate available from DKS International, Inc., Japan), 2.55 g of TERGITOL NP-40 (70 wt % in water) surfactant which is the reaction product of a nonylphenol and about 40 moles of ethylene oxide available from Union Carbide), 3.5 g of sodium carbonate, 9.67 g of styrene, 6.09 g of 2-ethylhexyl acrylate, and 2.15 g of acetoacetoxyethyl methacrylate. A nitrogen purge was begun, then the contents of the reactor brought up to 80° C. at 400 rpm. After reaching 80° C., an initiator solution composed of 2.3 g of sodium persulfate dissolved in 13.0 g of water was fed into the reactor at emulsion feed composed of 120 g of water, 6.55 g of AEROSOL 18 surfactant (N-octadecyl sulfosuccinamate anionic surfactant, available from Cytec Industries, Inc), 10.22 g of TERGITOL NP-40 (70 wt %), 183.6 g of styrene (STY), 115.63 g of 2-ethylhexyl acrylate (2EHA), and 40.81 g of acetoacetoxyethyl methacrylate was fed into the reactor at 1.72 g/min. Five minutes after the feeds were completed, an initiator solution composed of 0.4 g of sodium persulfate and 0.4 g of sodium metabisulfite dissolved in 12 g of water was added to the reactor and heating continued for 30 minutes. The latex was cooled, and 13.4 g of ammonium hydroxide (29%) was pumped into the latex. The latex was then filtered through 100 mesh wire screen. The latex was characterized as follows: Solids level, 41.6; amount of dried material (100 mesh screen), 0.55 g; particle size (Dw), 58 nm; Tg of polymer (as determined by differential scanning calorimeter, DSC), 8° C.

EXAMPLE 2

Preparation of Small Unstructured Acetoacetoxy-Containing Waterborne Particles (Latex particles contain 13.6% AAEM; Oxygen Content: 16.9%)

To a 1,000 mL resin kettle equipped with a condenser, nitrogen purge, and subsurface feed tube were added 340 g of water, 15.52 g of HITENSOL HS-20, 2.55 g of TERGITOL NP-40 (70 wt % in water), 3.5 g of sodium carbonate, 3.58 g of styrene, 11.64 g of 2-ethylhexyl acrylate, and 2.68 g of acetoacetoxyethyl methacrylate. A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 6.55 g of AEROSOL 18 (N-octadecyl sulfosuccinamate anionic surfactant available from Cytec Industries, Inc.), 10.22 g of TERGITOL NP-40 (70 wt % in water), 68.02 g of styrene, 221.06 g of 2-ethylhexyl acrylate, and 51.02 g of acetoacetoxyethyl methacrylate was fed into the reactor at 1.72 g/min. Five minutes after the feeds were completed, an initiator solution composed of 0.4 g of sodium persulfate and 0.4 g of sodium metabisulfite dissolved in 12 g of water was added to the reactor and heating continued for 30 minutes. The latex was cooled, and 16.8 g of ammonium hydroxide (28%) was pumped into the latex. The latex was then filtered through 100 mesh wire screen. The latex was characterized as follows: Solids level, 41.1; amount of dried material (100 mesh screen), 1.58 g; particle size (Dw), 58 nm; Tg of polymer, −36° C.

EXAMPLE 3

Preparation of Small Unstructured Acetoacetoxy-Containing Waterborne Particles (Latex particles contain 10.9% AAEM; Oxygen Content: 202.3%)

To a 1,000 mL resin kettle equipped with a condenser, nitrogen purge, and subsurface feed tube were added 340 g of water, 15.52 g of HITENSOL HS-20, 2.55 g of TERGITOL NP-40 (70 wt % in water), 3.5 g of sodium carbonate, 3.40 g of methyl methacrylate (MMA), 5.37 g of styrene (STY), 6.98 g of butyl acrylate (BA), and 2.15 g of acetoacetoxyethyl methacrylate (AAEM). A nitrogen purge was begun, then the contents of the reactor brought up to 80° C. under stirring at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, a monomer emulsion feed composed of 120 g of water, 6.55 g of AEROSOL 18, 10.22 g of TERGITOL NP-40 (70 wt % in water), 64.62 g of methyl methacrylate, 102.03 g of styrene, 132.64 g of butyl acrylate, and 40.81 g of acetoacetoxyethyl methacrylate was fed into the reactor at 1.72 g/min. Five minutes after the feeds were completed, an initiator solution composed of 0.4 g of sodium persulfate and 0.4 g of sodium metabisulfite dissolved in 12 g of water was added to the reactor and heating continued for 30 minutes. The latex was cooled, and 13.4 g of ammonium hydroxide (28%) was pumped into the latex. The latex was then filtered through 100 mesh wire screen. The latex was characterized as follows: Solids level, 41.0; ;amount of dried material (100 mesh screen), 0.17 g; particle size (Dw), 57 nm; Tg of polymer, 1.4° C.

EXAMPLE 4
Preparation of Small Unstructured Acetoacetoxy-Containing Waterborne Particles (Latex particles contain 10.9% AAEM; Oxygen Content: 26.7%)

To a 1,000 mL resin kettle equipped with a condenser, nitrogen purge, and subsurface feed tube were added 340 g of water, 15.52 g of HITENOL HS-20, 2.55 g of TERGITOL NP-40 (70 wt %), 3.5 g of sodium carbonate, 6.98 g of methyl methacrylate, 1.79 g of styrene, 6.98 g of butyl acrylate, and 2.15 g of acetoacetoxyethyl methacrylate. A nitrogen purge was begun, then the contents of the reactor brought up to 80° C. under stirring at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 6.55 g of AEROSOL 18, 10.22 g. of TERGITOL NP-40 (70 wt %), 132.64 g of methyl methacrylate, 34.01 g of styrene, 132.64 g of butyl acrylate, and 40.81 g of acetoacetoxyethyl methacrylate was fed into the reactor at 1.72 g/min. Five minutes after the feeds were completed, an initiator solution composed of 0.4 g of sodium persulfate and 0.4 g of sodium metabisulfite dissolved in 12 g of water was added to the reactor and heating continued for 30 minutes. The latex was cooled, and 13.4 g of ammonium hydroxide (28%) was pumped into the latex. The latex was then filtered through 100 mesh wire screen. The latex was characterized as follows: Solids level, 41.0; amount of dried material (100 mesh screen), 0.14 g; particle size (Dw), 57 nm; Tg of polymer, 2° C.

EXAMPLE 5—COMPARATIVE EXAMPLE
Enamine Latex E2950 available from Rohm and Haas This latex was analyzed by elemental analysis and found to have an oxygen content of 29.8%.

Evaluation of Enamine

To 100 g of each of the above latex were added with stirring 2 to 4 g of water, 1.2 g of TERGITOL NP-40, and 1.2 g of AEROSOL 18. The latex was then held in a thermostatic water bath at 50° or 60° C. To measure the enamine functionality remaining in the waterborne particles, films of the latex were cast over ZnSe, air dried for 15 minutes, then vacuum dried for 15 minutes. Using infrared spectroscopy, the relative magnitude of enamine absorption was determined by dividing the absorption of the enamine band at 1,568 $cm^{-1}$ by the styrene band at 1,602 $cm^{-1}$. The latexes were usually conditioned at temperature for at least one day to ensure complete reaction of the ammonia with acetoacetoxy moieties to form the enamine. Decomposition plots were prepared for each latex at 50° C. and 60° C.

EXAMPLE 6
Preparation of Large Unstructured Acetoacetoxy-Containing Waterborne Particles for Hydrolytic Stability Studies To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, and 0.01 g of sodium 2-acrylamido-2-methylpropanesulfonate (50% in water), and 17.9 g of monomer charge as shown in Table I below. A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 341.1 g of monomer charge, and 0.52 g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 42.6; amount of dried material (100 mesh screen), 0.20 g; particle size (Dw), 153 nm; Tg of polymer, 14° C.

EXAMPLES 7–9
Preparation of AAEM-based waterborne particles of varying oxygen content All latexes were prepared essentially as described in Example 6 except that for Example 7 less water was used to obtain higher solids. The monomer composition and characterization of each latex are shown in Tables I and II.

TABLE I

| | Percent of Monomers Used in Polymerization | | | | | |
|---|---|---|---|---|---|---|
| Latex from Experiment | STY | MMA | 2EHA | BA | AAEM | Oxygen Percent |
| 6 | 54 | | 34 | | 12 | 10.4 |
| 7 | 20 | | 65 | | 15 | 16.9 |
| 8 | 30 | 19 | | 39 | 12 | 20.3 |
| 9 | 10 | 39 | | 39 | 12 | 26.7 |

STY = styrene
MMA = methyl methacrylate
2EHA = 2-ethylhexyl acrylate
BA = butyl acrylate
AAEM = acetoacetoxyethyl methacrylate

TABLE II

| Latex from Experiment | Solids | Scrap (phr) | Tg (Cal'd) (°C.) | Particle Size (nm) | pH |
|---|---|---|---|---|---|
| 6 | 42.6 | 0.2 | 14 | 153 | 7.9 |
| 7 | 47.7 | 0.1 | −28 | 122 | 6.0 |
| 8 | 43.2 | 0.02 | 5 | — | 7.9 |
| 9 | 43.4 | 0.03 | 6 | — | 7.0 |

EXAMPLE 10

Hydrolytic Stability Studies of Examples 6 through 9

Figure 4:
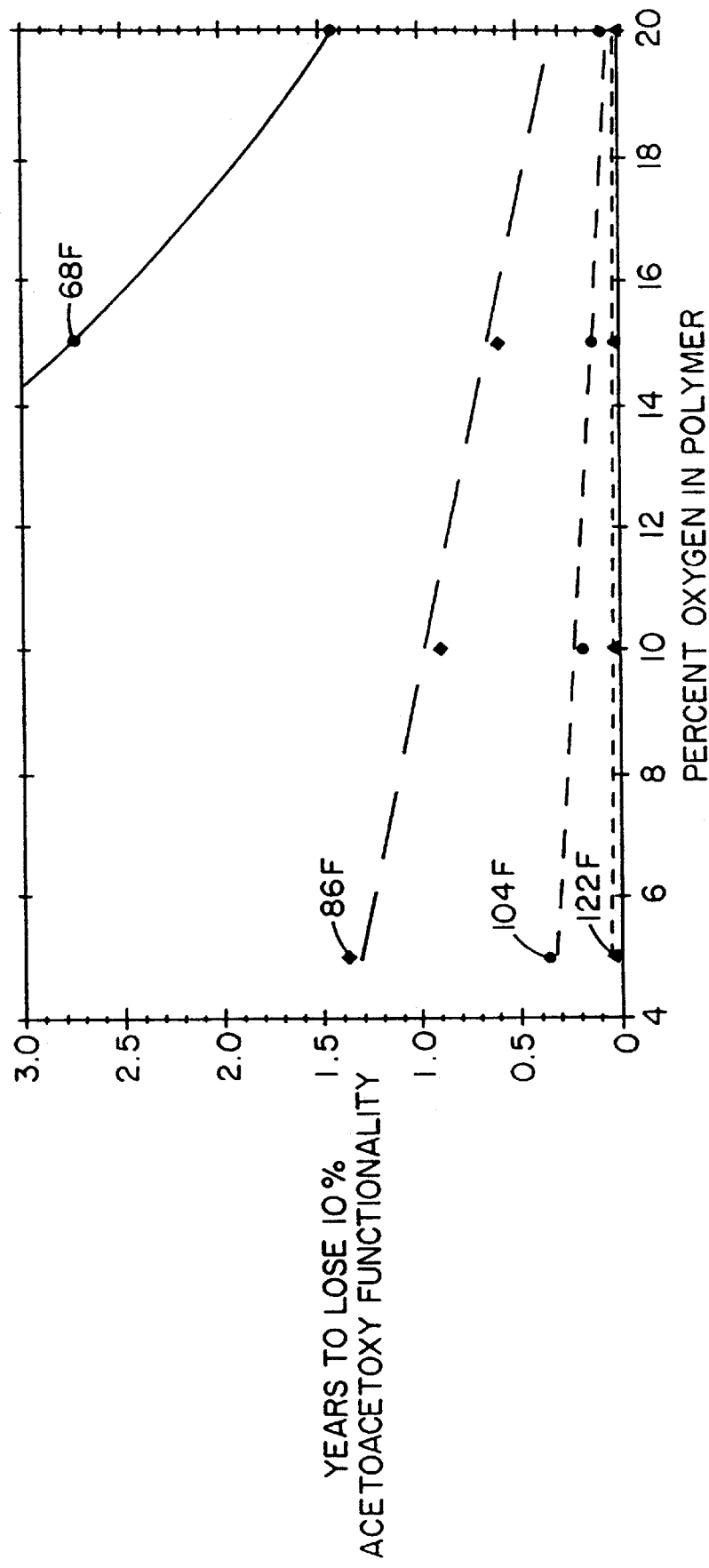
FIG. 4 depicts the stability to hydrolysis of acetoacetoxy-containing waterborne polymers expressed in years to lose 10% of acetoacetoxy functionality as a function of oxygen content.
Figure 5:
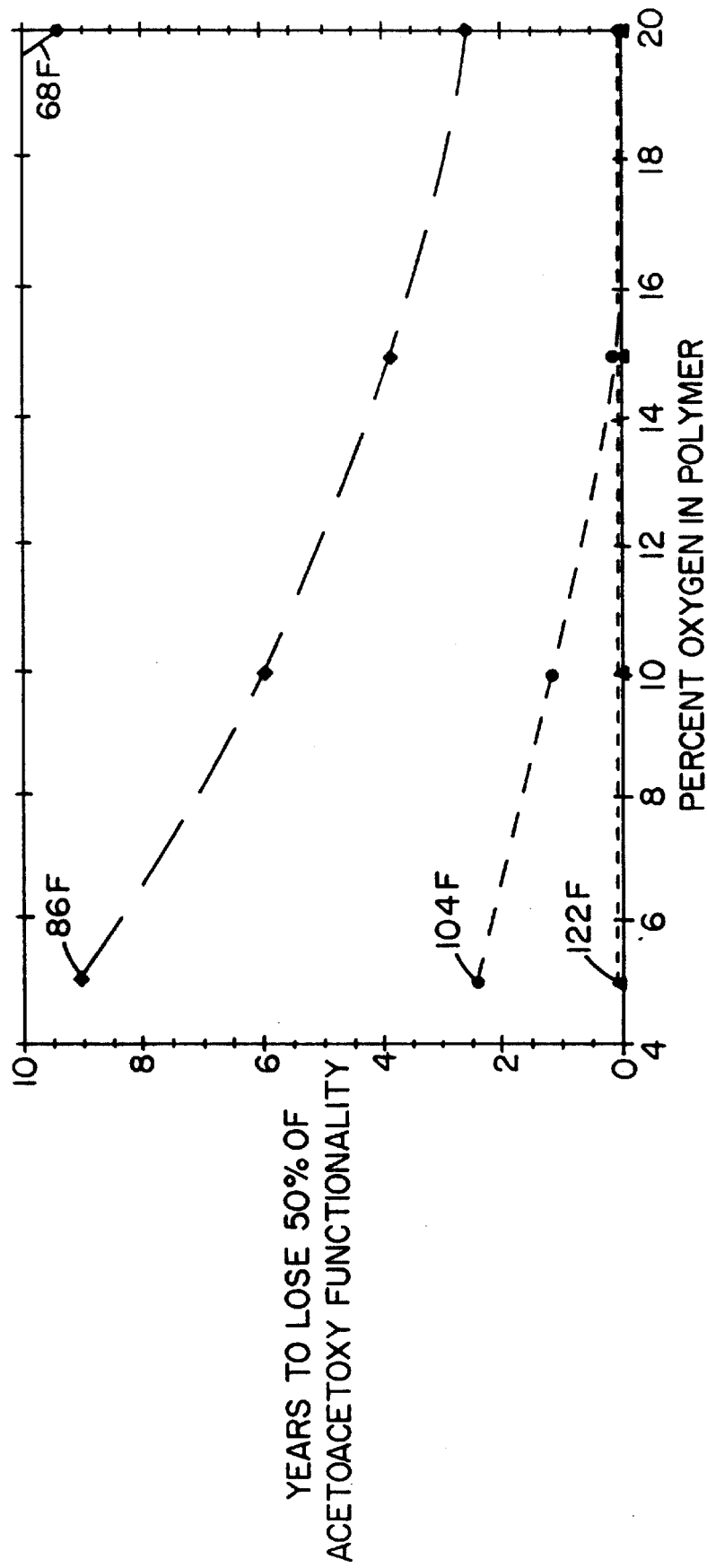
FIG. 5 depicts the stability to hydrolysis of acetoacetoxy-containing waterborne polymers expressed in years to lose 50% of acetoacetoxy functionality as a function of oxygen content.

Latexes were aged in a thermostatic bath at 50° C., 60° C., 70° C., and 80° C., and wet samples for films obtained as a function of time. Films were cast over ZnSe crystals, and the absorption at 1655 $cm^{-1}$ (which is characteristic of the carbonyl absorption after formation of the enol) and the styrene absorption at 1606 $cm^{-1}$ determined. Film thickness was normalized using the styrene absorption and the decrease in enol absorption calculated. First order rate plots, and Arrhenius rate plots were obtained for each latex. These plots were used to calculate the free energy of activation shown in Table III. The free energy of activation was used to calculate the contour plots for 10% hydrolysis of the acetoacetoxy moiety as a function of oxygen content of the waterborne particles, their storage time, and temperature. The results are shown in FIG. 4.

TABLE III

| Latexes from Experiment | Free Energy of Activation (Kcal/mole) |
| --- | --- |
| 6 | 29.40 |
| 7 | 20.06 |
| 8 | 28.68 |
| 9 | 28.30 |

EXAMPLE 11
Preparation of Small Unstructured Carbonate-Containing Vinyl Ester Waterborne Particles
(Oxygen Content 25.5%, VAM/VEOVA-10/VEOVA-5/VEC; 20/70/5/5)

To a 1000 mL resin kettle equipped with a condenser, nitrogen purge, and subsurface feed tube were added 435.6 g of water, 13.8 g of sodium vinyl sulfonate, 11.43 g of TERGITOL NP-40 (70%), 1.0 g of sodium carbonate, 40 g of a monomer solution composed of 80g of vinyl acetate, 280 g of VEOVA-10, 20 g of VEOVA-5, and 20 g of vinyl ethylene carbonate. A nitrogen purge was begun, then the contents of the reactor were brought up to 65° C. at 400 rpm. After reaching 65° C,. an initiator charge composed of 1.03 g of t-butyl hydroperoxide (70%) and 0.72 g of sodium formaldehyde sulfoxylate dissolved was added to the reactor. After five minutes the remaining monomer solution was fed in over 200 minutes, an initiator solution composed of 2.4 g of t-butyl hydroperoxide dissolved in 80 g of water, and 1.68 g of sodium formaldehyde sulfoxylate dissolved in 80 g were fed into the reactor over 200 minutes. Fifteen minutes after the initiator solutions were completed, the reactor was cooled to 40° C. Post initiators and a catalyst composed of isoascorbic acid (0.53 g), and t-butyl hydroperoxide (0.53 g), and a 1% iron sulfate solution (0.53 g) were charged sequentially to the reactor and heating continued for 30 minutes. Solids, 383.7%, filterable dry solids (100 mesh screen), 3.2 g, pH, 4.64; particle size, 225 nm (Electron Micrographs); IR (carbonate absorption), 1815 cm$^{-1}$.

EXAMPLE 12
Preparation of Small Unstructured Carbonate-Containing Vinyl Ester-Acrylic
Waterborne Particles (Oxygen Content 32.6%, VAM/VEOVA-10/BA/NVEC; 65/10/20/5)

To a 1000 mL resin kettle equipped with a condenser, nitrogen purge, and subsurface feed tube were added 435.6 g of water, 13.8 g of sodium vinyl sulfonate, 11.43 g of TERGITOL NP-40 (70%), 1.0 g of sodium carbonate, 40 g of a monomer solution composed of 280 g of vinyl acetate, 40 g of VEOVA-10, 80 g of butyl acrylate, and 20 g of vinyl ethylene carbonate. A nitrogen purge was begun, then the contents of the reactor were brought up to 65° C. at 400 rpm. After reaching 65° C., an initiator charge composed of 1.03 g of t-butyl hydroperoxide (70% aqueous solution) and 0.72 g of sodium formaldehyde sulfoxylate dissolved was added to the reactor. After five minutes the remaining monomer solution was fed in over 200 minutes, an initiator solutions composed of 2.4 g of t-butyl hydroperoxide dissolved in 80 g water, and 1.68 g of sodium formaldehyde sulfoxylate dissolved in 80 g were fed into the reactor over 200 minutes. Fifteen minutes after the initiator solutions were completed, the reactor was cooled to 40° C. Post initiators and a catalyst composed of isoascorbic acid (0.53 g), and t-butyl hydroperoxide (0.53 g, 70% aqueous solution), and a 1% iron sulfate solution (0.53 g) were charged sequentially to the reactor and heating continued for 30 minutes. Solids, 38.7%; filterable dry solids (100 mesh screen), 3.2 g; pH, 4.64; particle size, 150 nm (Electron Micrographs); IR (carbonate absorption), 1815 cm$^{-1}$.

EXAMPLE 13
Hydrolytic Stability Studies of Examples 11 and 12

Latexes were aged in a thermostatic bath at 50° C., 60° C., 70° C., and 80° C., and wet samples for films obtained as a function of time. Films were cast over ZnSe crystals, and the absorption at 1815 cm$^{-1}$ and the styrene absorption at 1606 cm$^{-1}$ determined. Film thickness was normalized using the styrene absorption and the decrease in carbonate absorption calculated. The data obtained from the hydrolysis of the carbonate moieties is plotted as the natural log (ln) of the initial carbonate absorption divided by the carbonate absorption as a function of time.

EXAMPLE 14
Preparation of Small Unstructured Epoxide-Containing Waterborne Particles To a 1000 mL resin kettle equipped with a condenser, nitrogen purge, and subsurface feed tube were added 351 g of water, 0.716 g of AEROSOL OT-75, 5.11 of TERGITOL NP-40 (70%), 2.05 g. of sodium carbonate, 3.58 g of methyl methacrylate, 11.63 g of 2-ethylhexyl acrylate, 2.68 g of glycidyl methacrylate, and 0.014 g of 2-acrylamido-2-methylpropanesulfonate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. A monomer feed composed of 4.10 g of AEROSOL OT-75, 68.02 g of methyl methacrylate, 221.96 g of 2-ethylhexyl acrylate, 51.01 g of glycidyl methacrylate, and 0.26 g of the sodium salt of 2-acrylamido-2-methylpropanesulfonate was begun at 1.72 g/min. Five minutes after the first emulsion feed was begun, an initiator solution composed of 1.3 g of sodium persulfate dissolved in 33.5 g of water was fed at 0.16 g/min. Five minutes after the monomer emulsion feed was completed, a post initiator solution of 0.4 g of sodium persulfate and 0.4 g of sodium metabisulfite dissolved in 12 g of water was charged and heating continued for 30 minutes. The emulsion was cooled, then the latex was filtered through 100 mesh wire screen. Solids level, 46.8; amount of dried material (100 mesh screen), 8.93 g; pH, 8.2; infrared analysis of clear films cast over ZnSe showed an epoxide absorption at 910 cm$^{-1}$; oxygen content, 22.7%.

EXAMPLE 15
Preparation of Small Unstructured Epoxide-Containing Waterborne Particles To a 1000 mL resin kettle equipped with a condenser, nitrogen purge, and subsurface feed tube were added 290 g of water, 1.34 g of TREM LF-40, 1.79 g of TERGITOL NP-40 (70%), 2.05 g of sodium carbonate, 33.58 g of methyl methacrylate, 11.63 g of butyl acrylate, 2.68 g of glycidyl methacrylate, and 0.010 g of 2-acrylamide-2-methylpropanesulfonate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. An emulsion feed composed of 120 g of water, 9.94 g of AEROSOL 18, 7.16 g of TERGITOL NP-40 (70%), 68.02 g of methyl methacrylate, 221.96 g of butyl acrylate, 51.01 g of glycidyl methacrylate, and 0.26 g of the sodium salt of 2-acrylamido-2- methylpropanesulfonate was begun at 1.72 g/min. Five minutes after the first emulsion feed was begun, an initiator solution composed of 1.3 g of sodium persulfate dissolved in 33.5 g of water was fed at 0.16 g/min. Five minutes after the monomer emulsion feed was completed, a post initiator solution of 0.4 g of sodium persulfate and 0.4 g of sodium metabisulfite dissolved in 12 g of water was charged and heating continued for 30 minutes. The emulsion was cooled, then the latex was filtered through 100 mesh wire screen. Solids level; 43.6, amount of dried material (100 mesh screen), 0.14 g; pH, 8.5; particle size, 161 nm; infrared analysis of clear films cast over ZnSe showed an epoxide absorption at 910 cm$^{-1}$; oxygen content, 27.7%.

EXAMPLE 16

Evaluations of Examples 14 and 15

Figure 8:
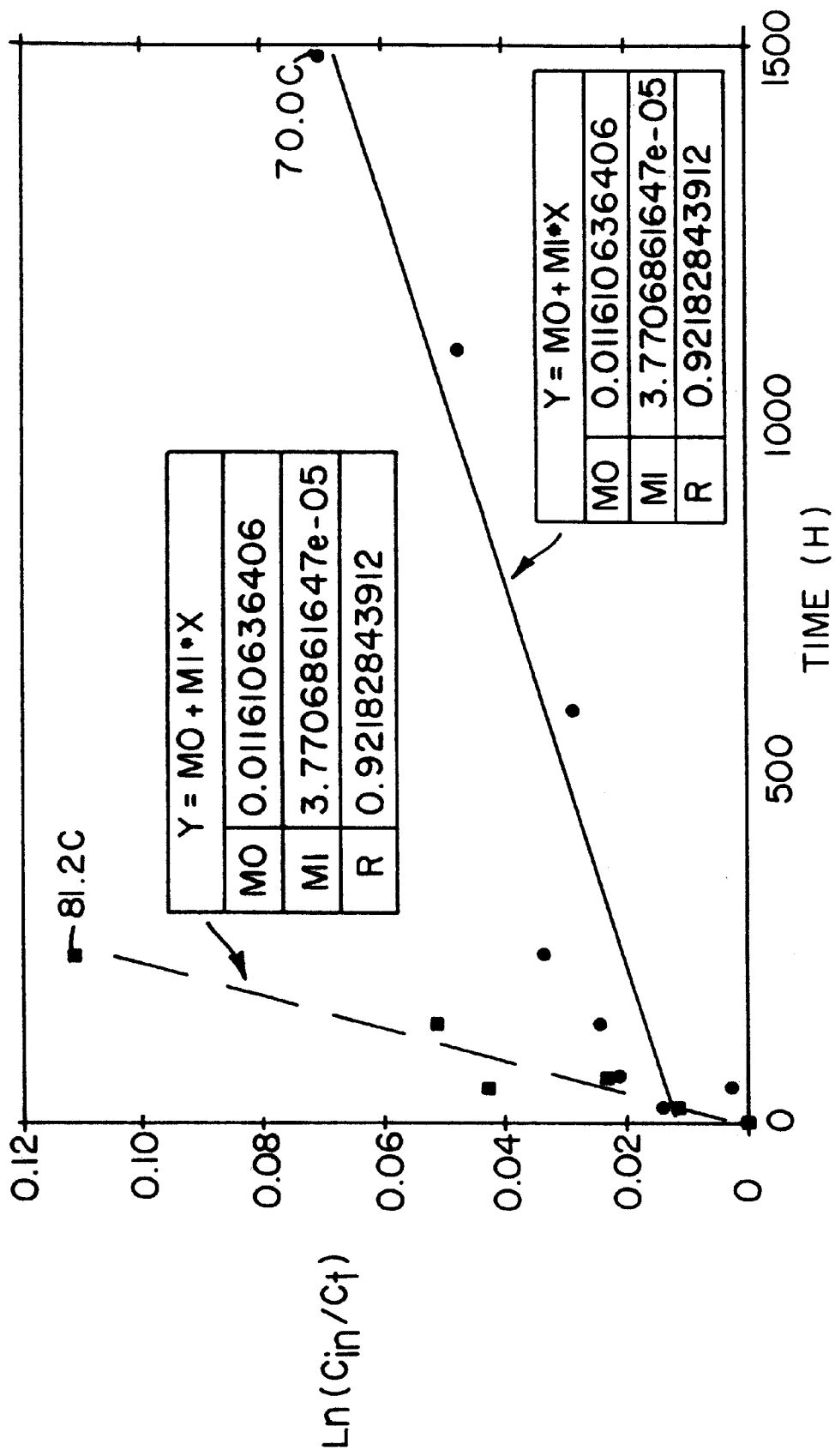
FIG. 8 depicts hydrolysis data of an acrylic latex (Example 14, oxygen content 22.7%) containing an epoxide functional group.
Figure 9:
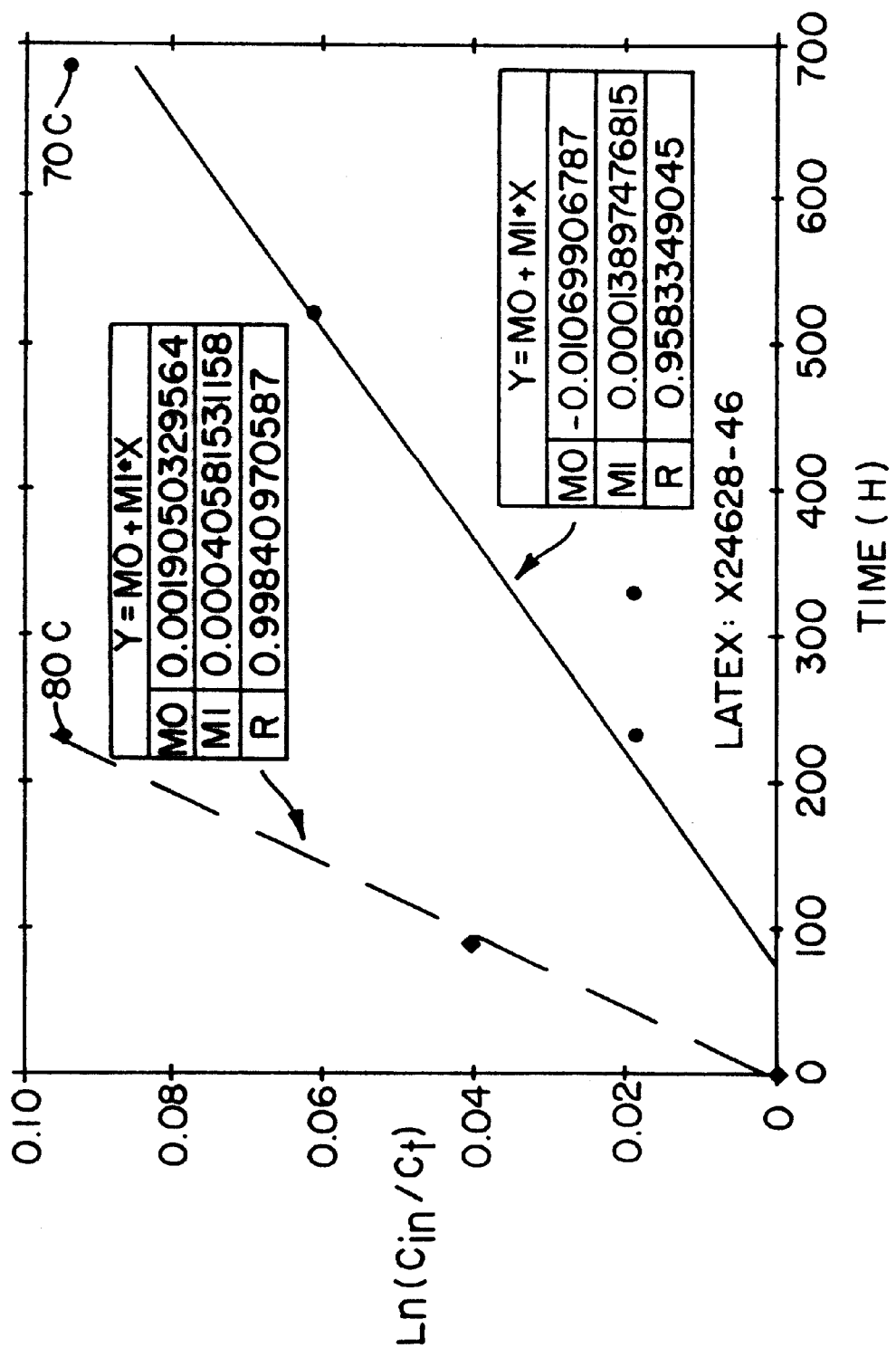
FIG. 9 depicts hydrolysis data of an acrylic latex (Example 15, oxygen content 27.7%) containing an epoxide functional group.
Figure 10:
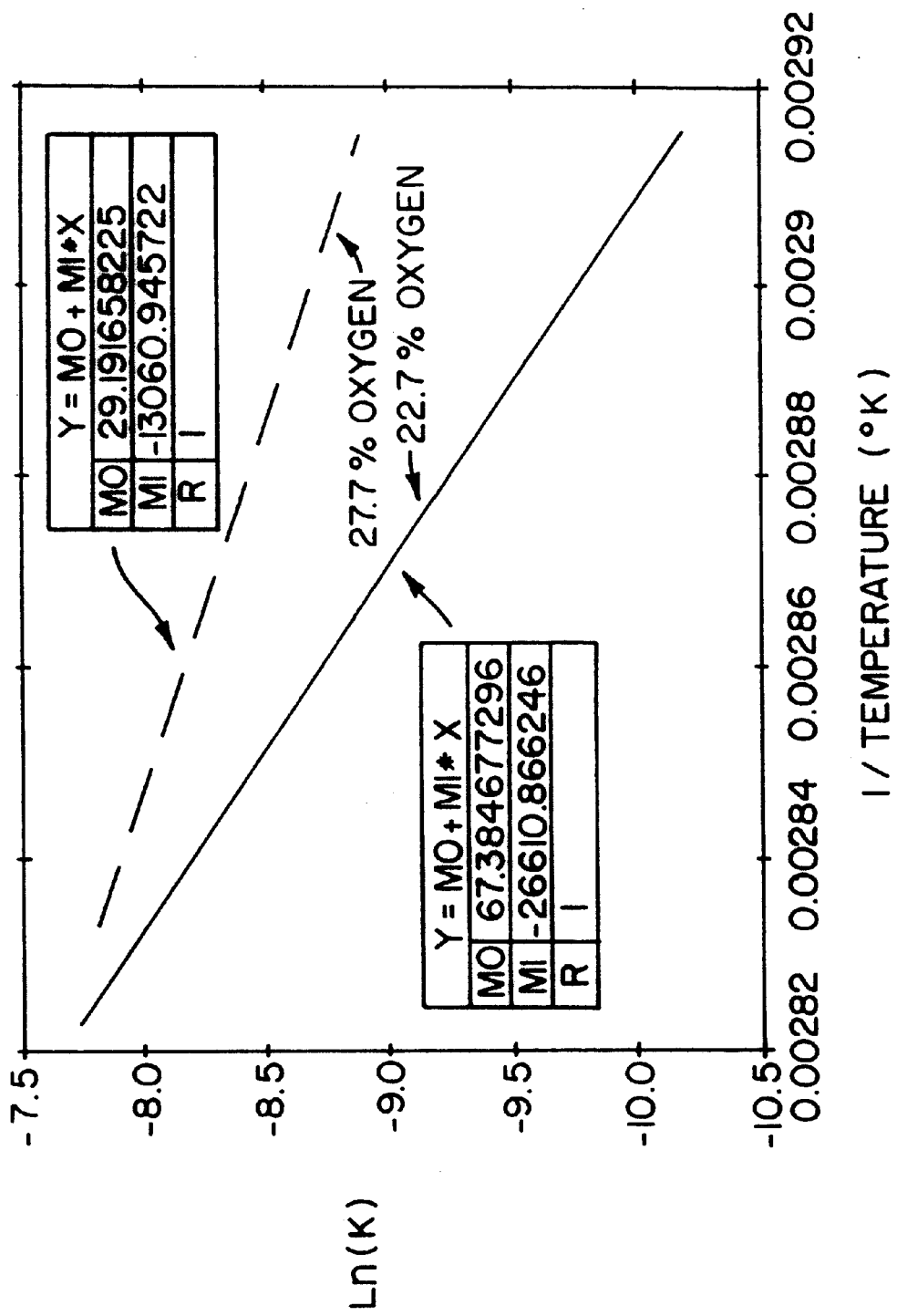
FIG. 10 depicts Arrhenius rate plots of epoxide hydrolysis of Examples 14 and 15.
Figure 11:
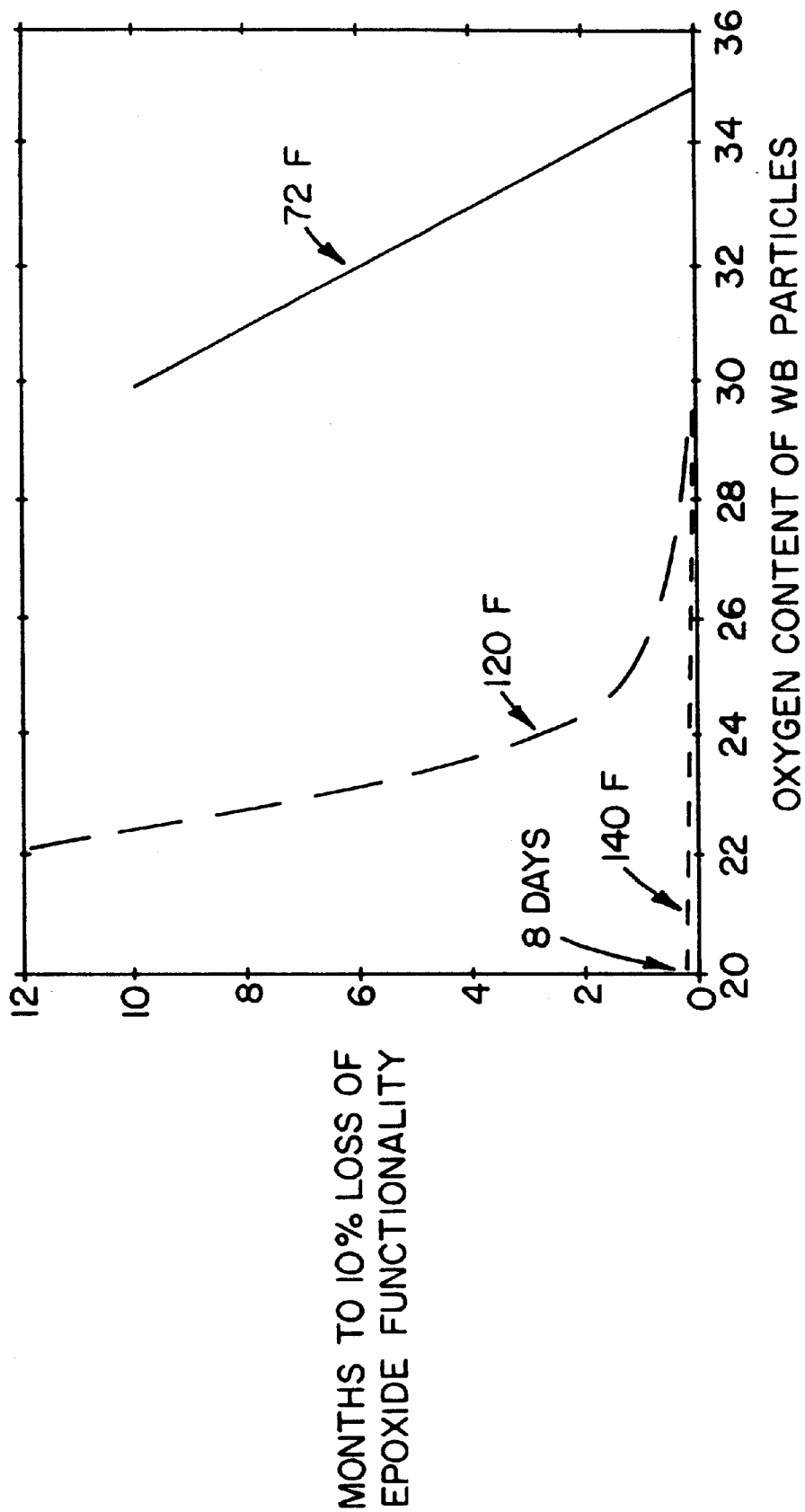
FIG. 11 depicts the stability to hydrolysis of an epoxide-containing waterborne polymer, expressed in months to lose 10% of epoxide functionality, as a function of oxygen content and temperature.

To 100 g of latex was added 1.29 g of AEROSOL 18, 1.29 g of TERGITOL NP-40 (70%), and water to adjust the final solids to 40%. The latexes were then placed in a thermally controlled bath at 70 and 80° C. For analysis, small aliquots of latex were taken from samples in the heated baths, and films cast over ZnSe. The epoxide absorption at 910 cm$^{-1}$ was used to quantify the level of epoxide. As shown in FIGS. 8 and 9, first order rate plots were obtained. FIG. 10 shows the Arrhenius Rate Plots for the hydrolysis of the epoxide moiety in Examples 14 and 15.

Obviously, numerous modifications and variations of the present invention are possible in light of the above teachings. It is therefore to be understood that within the scope of the appended claims, the invention may be practiced otherwise than as specifically described herein.

The claimed invention is:

1. A functional latex polymer composition, comprising:
   a vinyl polymer of copolymerizable monoethylenically unsaturated monomers wherein at least one monomer contains at least one pendant hydrolyzable functional moiety;
   wherein the combined oxygen and nitrogen content of said copolymerizable monoethylenically unsaturated monomers is up to about 27 wt %, based on the total weight of said copolymerizable monoethylenically unsaturated monomers; and
   wherein said vinyl polymer is resistant to hydrolysis.

2. The functional latex polymer composition of claim 1, wherein said monomer containing at least one pendant hydrolyzable functional moiety is present in an amount of from 3 to 30 wt %, based on the total weight of said copolymerizable monoethylenically unsaturated monomers.

3. The functional latex polymer composition of claim 1, wherein said monomer containing at least one pendant hydrolyzable functional moiety is present in an amount of from 12 to 15 wt %, based on the total weight of said copolymerizable monoethylenically unsaturated monomers.

4. The functional latex polymer composition of claim 1, wherein said pendant hydrolyzable functional moiety is selected from the group consisting of acetoacetoxy group, carbonate group, epoxide group and isocyanate group.

5. The functional latex polymer composition of claim 4, wherein the combined oxygen and nitrogen content is up to about 20 wt %, based on the total weight of said copolymerizable monoethylenically unsaturated monomers.

6. The functional latex polymer composition of claim 4, wherein the combined oxygen and nitrogen content is up to about 10 wt % based on the total weight of said copolymerizable monoethylenically unsaturated monomers.

7. The functional latex polymer composition of claim 4, wherein said acetoacetoxy group is converted to an enamine group by reaction with ammonia or a primary amine capable of enamine formation.

8. The functional latex polymer composition of claim 7, wherein the combined oxygen and nitrogen content is up to about 20 wt %, based on the total weight of said copolymerizable monoethylenically unsaturated monomers; and wherein said enamine group remains substantially unhydrolyzed after 1500 hours at 50° C.

9. The functional latex polymer composition of claim 7, wherein the combined oxygen and nitrogen content is up to about 10 wt %, based on the total weight of said copolymerizable monoethylenically unsaturated monomers; and wherein said enamine group remains substantially unhydrolyzed after 1500 hours at 50° C.

10. A method for producing a functional latex polymer, comprising:
    forming an aqueous monomer mixture comprising copolymerizable monoethylenically unsaturated monomers at least one of which contains at least one pendant hydrolyzable functional moiety, wherein the combined oxygen and nitrogen content of said monomer mixture ranges up to a level of up to about 27 wt %, based on the total weight of said monomer mixture;
    adjusting the temperature of said monomer mixture to a level of from 55° C. to 90° C.; and
    polymerizing said monomer mixture to form a functional latex polymer composition resistant to hydrolysis.

11. The method of claim 10, wherein said pendant hydrolyzable functional moiety is selected from the group consisting of acetoacetoxy group, carbonate group, epoxy group and isocyanate group.

12. The method of claim 10, wherein the combined oxygen and nitrogen content is adjusted to a level of up to about 20 wt % based on the total weight of said monomer mixture.

13. The method of claim 10, wherein the combined oxygen and nitrogen content is adjusted to a level of up to about 10 wt % based on the total weight of said monomer mixture.

14. The method of claim 11, further comprising converting said acetoacetoxy group to a pendent enamine group by reaction with a molar excess of ammonia or a primary amine capable of enamine formation.

15. The method of claim 14, wherein the combined oxygen and nitrogen content is adjusted to a level of up to about 20 wt % based on the total weight of said monomer mixture; and wherein said enamine group remains substantially unhydrolyzed after 1500 hours at 50° C.

16. The method of claim 14, wherein the combined oxygen and nitrogen content is adjusted to a level of up to about 10 wt % based on the total weight of said monomer mixture; and wherein said enamine group remains substantially unhydrolyzed after 1500 hours at 50° C.

17. The functional latex polymer composition of claim 1, wherein said monomer containing at least one pendant hydrolyzable functional moiety is acetoacetoxyethyl (meth)acrylate.

18. The functional latex polymer composition of claim 1, wherein said monomer containing at least one pendant hydrolyzable functional moiety is selected from the group consisting of $CH_2$=$CH$—$O$—$C(O)$—$C(CH_3)_3$, $CH_2$=$CH$—$O$—$C(O)$—$CH(C_2H_5)(C_4H_9)$, and $CH_2$=$CH$—$O$—$C(O)$—$CH_2CH_3$.

19. The functional latex polymer composition of claim 1, wherein said monomer containing at least one pendant hydrolyzable functional moiety is selected from the group consisting of glycidyl (meth)acrylate, allyl glycidyl ester,

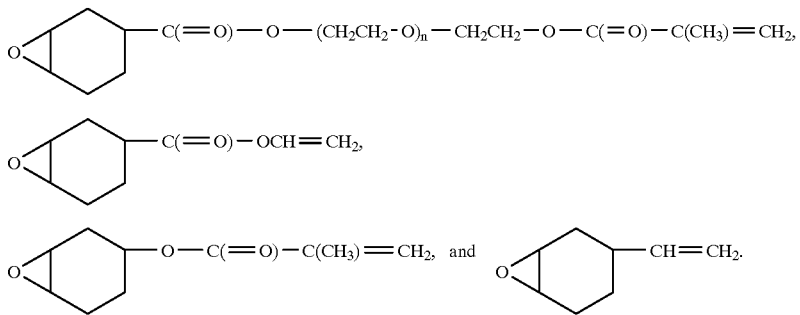
20. The functional latex composition of claim 1, wherein said monomer containing at least one pendant hydrolyzable functional moiety is m-isopropenyl-α,α-dimethylbenzyl isocyanate.
* * * * *